US010607308B2

(12) United States Patent
Burgess et al.

(10) Patent No.: US 10,607,308 B2
(45) Date of Patent: Mar. 31, 2020

(54) SYSTEM AND METHOD FOR MONITORING A TRAVELING PASSENGER REQUIRING ASSISTANCE

(71) Applicant: The Boeing Company, Chicago, IL (US)

(72) Inventors: Michael J. Burgess, Seattle, WA (US); Scott T. Yoshimura, Portland, OR (US); Richard K. Simms, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 1002 days.

(21) Appl. No.: 14/219,339

(22) Filed: Mar. 19, 2014

(65) Prior Publication Data

US 2015/0269699 A1 Sep. 24, 2015

(51) Int. Cl.
*G06Q 50/26* (2012.01)
*H04W 12/08* (2009.01)
*G06Q 50/14* (2012.01)

(52) U.S. Cl.
CPC .......... *G06Q 50/265* (2013.01); *G06Q 50/14* (2013.01); *H04W 12/08* (2013.01)

(58) Field of Classification Search
CPC ..... G06Q 50/14; H04L 41/0293; H04L 67/12; H04W 12/08
See application file for complete search history.

(56) References Cited

U.S. PATENT DOCUMENTS

2002/0095318 A1* 7/2002 Parry .................... G06Q 10/02 705/5
2003/0085268 A1* 5/2003 Kruse .................... A45C 13/42 235/375
2005/0197848 A1* 9/2005 Chou .................. G06Q 10/025 705/7.41
2008/0001704 A1* 1/2008 Roston .............. G08B 21/0202 340/5.8
2008/0133127 A1* 6/2008 Havens .................. G06Q 10/06 701/519

(Continued)

OTHER PUBLICATIONS

Air China, Unaccompanied Minors, Dec. 31, 2012, http://www.airchina.com.cn/en/info_and_services/um.shtml.*

(Continued)

*Primary Examiner* — Evangeline Barr
(74) *Attorney, Agent, or Firm* — Patterson + Sheridan, LLP

(57) ABSTRACT

A system and method for monitoring a passenger requiring assistance during travel, such as an unaccompanied minor, a disabled passenger, or an elderly passenger, on a common carrier. The system includes a machine-readable tag such as a Quick Response code (QR code) or a RFID tag that references passenger information, including itinerary information. A first mobile device of a first agent decodes the QR code to present the unaccompanied minor information. A second mobile device of a second agent decodes the QR code to present the unaccompanied minor information. In one embodiment, the QR code includes a uniform resource locator (URL) for accessing the passenger information and the first and second agents can authorize and accept the transfer of the unaccompanied minor by interfacing with a user interface.

27 Claims, 11 Drawing Sheets

(56) References Cited

U.S. PATENT DOCUMENTS

| | | | | |
|---|---|---|---|---|
| 2009/0322866 | A1* | 12/2009 | Stotz | G07C 9/00087 348/77 |
| 2013/0305059 | A1* | 11/2013 | Gormley | G07F 7/08 713/189 |
| 2014/0136652 | A1* | 5/2014 | Narayanaswami | H04L 67/02 709/217 |

OTHER PUBLICATIONS (Air China website, http://www.airchina.com.cn/en/info_and_services/um.shtml; Unaccompanied Minors, Dec. 31, 2012) (Year: 2012).*

* cited by examiner 62, 76, 102
66
68
90
92
98
Kyle Anderson
Transfer Authority
To: Betty Andrews
Transfer
Deny 62, 76, 102
68
94
96
100
66
Kyle Anderson
Receiving Authority
From: Diane Lee?
Receive
Reject 102
110
112
52
114
Done
Kyle
Anderson Sr.
X
Kyle Anderson Sr.

SYSTEM AND METHOD FOR MONITORING A TRAVELING PASSENGER REQUIRING ASSISTANCE

TECHNICAL FIELD

The field of the embodiments presented herein relates to a common carrier monitoring a passenger requiring assistance, such as an unaccompanied minor or a disabled or elderly passenger and, in particular, to electronic recording of the transfers of responsibility for a passenger between agents before, during and after travel.

BACKGROUND

Certain passengers, such as unaccompanied minors, disabled persons, or the elderly, may require assistance when traveling on a common carrier, such as an airplane, train or ship. The specific definition of an unaccompanied minor varies from country to country and common carrier to common carrier. However, an unaccompanied minor in the United States generally is a child between the ages of 5 and 11, without the presence of a legal guardian. For unaccompanied minors when traveling by commercial air, for example, multiple airline agents before, during and after the flight are required to maintain and transfer responsibility of or authority for, the unaccompanied minor. The current process for documenting transfers of responsibility for the unaccompanied minor is a cumbersome paper process.

Typically, the unaccompanied minor's trip begins with the unaccompanied minor and an adult guardian checking in at the ticket counter. The carrier ticketing agent enters itinerary information and information about the unaccompanied minor into a networked computer system. This information includes the name of a second adult guardian who will be waiting for the unaccompanied minor at the unaccompanied minor's destination location. A ticket is printed by the ticketing agent for the unaccompanied minor's flight and then the unaccompanied minor, and their adult guardian, proceed to the departure gate for the corresponding flight.

Continuing with existing travel procedures, when the adult guardian and the unaccompanied minor check in at the departure gate the carrier gate agent prints out paper transfer documents that accompany the unaccompanied minor throughout the flight. The adult guardian signs a paper transfer document to transfer responsibility for the unaccompanied minor to the gate agent and the unaccompanied minor is left at the departure gate. A paper copy of a portion of the paper transfer documents is retained by the adult guardian. The gate agent then escorts the unaccompanied minor onto the aircraft where responsibility for the unaccompanied minor is transferred to one of the flight attendants. The flight attendant signs a paper transfer document. A copy of a portion of the paper transfer documents is retained by the gate agent. The flight attendant retains the remainder of the paper transfer documents throughout the flight. Thus, once the first adult guardian leaves the unaccompanied minor at the gate with a carrier agent there is no centralized "real time" record of the location of the minor.

After the aircraft lands at a connection or destination location, the unaccompanied minor is escorted off the aircraft by the flight attendant to a second gate agent or the second gate agent boards the aircraft to transfer responsibility for the unaccompanied minor. The second gate agent signs the paper transfer document and a portion of the transfer documents is retained by the flight attendant. If at the unaccompanied minor's destination location, the second carrier gate agent escorts the unaccompanied minor to the second adult guardian that was designated by the first adult guardian at the departure location. The second adult guardian signs the paper document and a portion of the paper packet is given to the second adult guardian, and the remainder of the paper transfer documents is retained by the second gate agent.

The first gate agent at the departure airport, the flight attendant of the flight, and the second gate agent at the destination airport each have retained a paper portion of the paper transfer documents, and are required to retain their portion for a period of time, in accordance with the carrier airline's document retention policy. No real time record of the status of any of the transfers of responsibility for the unaccompanied minor, or other information regarding the passenger, such as itinerary, contact information, location in the airport/station, e.g. if separated from gate agent or flight attendant, are stored electronically by the airline and, therefore, real-time updates regarding the unaccompanied minor's status, including detection of a possible failure of transfer to a gate agent or to a connection gate for continuing travel to a final destination, are not possible.

Similarly, disabled or elderly passengers, or other passengers requiring assistance, whom may or may not be accompanied by an escorting adult or guardian, are not presently provided with real-time monitoring to provide accommodations during travel, transfer between carrier gate agents and flight attendants, or status reports regarding their location.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a system for monitoring a passenger requiring assistance during travel on a common carrier is provided. A machine-readable tag is associated with the passenger and includes passenger information. A first mobile device of a first agent decodes the machine-readable tag to present the passenger information on the first mobile device to the first agent. A second mobile device of a second agent decodes the machine-readable tag to present the passenger information on the second mobile device to the second agent.

According to another embodiment disclosed herein, a system for transferring responsibility of an unaccompanied minor aboard a commercial airline is provided. The system includes a machine-readable tag having encoded unaccompanied minor information. The machine-readable tag is generated by a ticketing agent of the commercial airline and then the machine-readable tag is associated with the accompanied minor. A first mobile device of a first gate agent is configured to decode the machine-readable tag to present the unaccompanied minor information on the first mobile device, to authorize transfer of responsibility for the unaccompanied minor from a first adult guardian to the first gate agent, and to authorize transfer of responsibility for the unaccompanied minor from the first gate agent to a flight attendant. A second mobile device of the flight attendant is configured to decode the machine-readable tag to present the unaccompanied minor information on the second mobile device, and to accept transfer of responsibility for the unaccompanied minor from the first gate agent to the flight attendant. The machine-readable tag includes information such as a uniform resource locator (URL) wherein a graphic user interfaces on the first and second mobile devices present the unaccompanied minor information accessed with the URL.

According to yet another embodiment disclosed herein, a method for monitoring a passenger requiring assistance during travel on a common carrier is provided. The method includes encoding information associated with passenger information into a machine-readable tag and associating the machine-readable tag to the passenger. The method then includes decoding the machine-readable tag using a first mobile device at a first gate of the common carrier to display the passenger information on the first mobile device, to authorize transfer of responsibility for the passenger to the first agent, and to authorize transfer of responsibility for the passenger from the first agent to a second agent. The method also includes decoding the machine-readable tag using a second mobile device of the second agent to display the passenger information on the second mobile device, and to accept transfer of responsibility for the passenger from the first agent to the second agent, wherein the machine-readable tag includes a URL and wherein a graphic user interfaces on the first and second mobile devices displays the passenger information accessed by the URL. The method then includes decoding the machine-readable tag using a third mobile device of a third agent at a destination location to authorize transfer of responsibility for the passenger from the second agent to the third agent at the destination location.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

Figure 1:
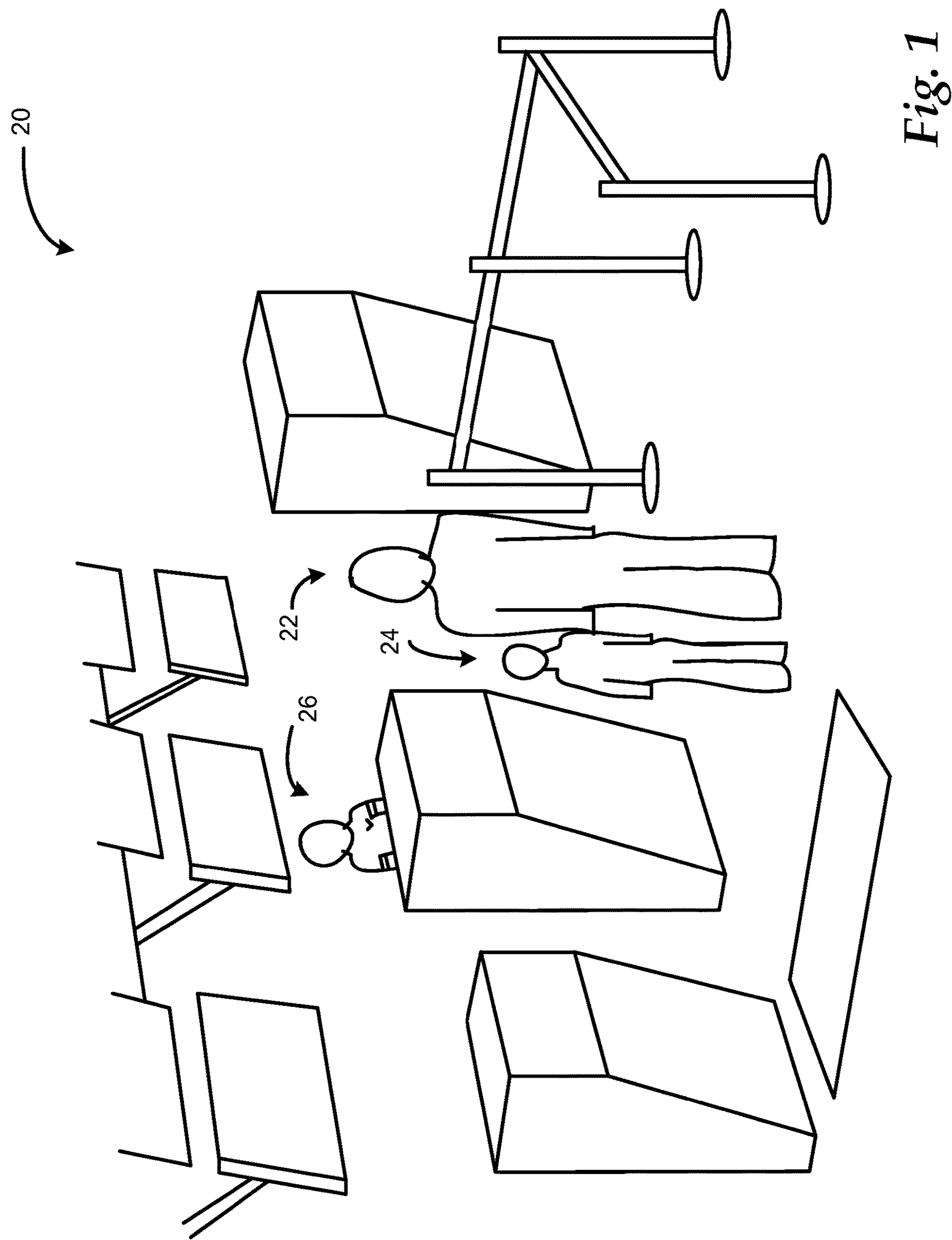
FIG. 1 illustrates a first adult guardian and a minor at a carrier ticketing counter before a flight that the minor will be taking unaccompanied, according to at least one embodiment disclosed herein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to retrieving machine-readable encoded information regarding a passenger, such as an unaccompanied minor, disabled or elderly person, or some other passenger requiring special assistance, during travel on a common carrier. In particular, the invention provides electronic recording of the transfers of responsibility between carrier agents and flight attendants, and of relevant passenger information, including itinerary, the need for accommodations, such as special meals or a wheelchair, and location of the passenger in the carrier station, before, during and after travel. The present disclosure is susceptible of embodiment in many different forms.

A common carrier transports passengers for a fee and can include, but is not limited to, a bus, taxicab, train, cruise ship, or a commercial airline. For the sake of simplicity in explaining aspects of the present disclosure, this specification will proceed utilizing agents of one or more commercial airlines, of an airport, or an agency contracted by either a commercial airline or the airport, as the primary example. Also, for the sake of simplicity in explaining aspects of the present disclosure, this specification will proceed utilizing an unaccompanied minor as the primary example which should be interpreted to be interchangeable with either a disabled or elderly passenger, or some other passenger requiring special assistance from the common carrier. An unaccompanied minor, a disabled passenger, or other passenger requiring special assistance from the common carrier or the airport may be referred to collectively and/or generically as a "passenger." Also, the agents assisting a passenger before, during and after travel may be associated with more than one carrier, more than one transport station, such as an airport or train station, and/or more than one contracting agency. However, there is no intent to limit the principles of the present disclosure to the particular disclosed embodiments.

In the present invention, encoded information in the form of barcodes printed on surface of articles such as wristbands, paper or items of clothing, enables consumers to find additional information. For example, a user can take a digital photograph of a barcode with, for example, a digital-camera-equipped cellular telephone, personal digital assistant (PDA), or mobile tablet computing device, which may hereinafter be referred to collectively and/or generically as a "mobile device" or simply just as a "device." The devices are configured to perform the tasks, functions, and operations of the invention described below. The various tasks may be performed by a user interface that includes software, hardware, firmware, or any combination thereof. The user interface provides an onscreen display of information that may be arranged in various ways. It should be appreciated that any number of additional or alternative tasks may be included, and may be incorporated into a more comprehensive procedure or process having additional functionality not described in detail herein.

Mobile devices, in additional to having a camera, typically also have a network connection, for example by way of a wireless connection or cellular network connection, with the internet. Having captured an image of a sign or product having a barcode, software applications in the device are currently available to extract and decode the barcode, connect to the internet, retrieve additional information related to the barcode, and display the information to the user of the device.

This capability can be performed using many different types of common barcode formats, such as Universal Product Code (UPC) barcodes or Code 39 type barcodes, which are one-dimensional codes. Some computer network addresses on the internet, in the form of a Uniform Resource Locator (URL), can be over 100 characters long. In such cases, a remote networked database may be provided to convert barcode values into URL strings. Also, two-dimensional codes or matrix codes may be used. For example, Quick Response codes (QR codes) have the ability to store large strings of data in a two-dimensional array. Machine-readable representations of data such as, but not limited to, a one-dimensional code, a two-dimensional code, a matrix code, a barcode, or a QR code, may hereinafter be referred to as "machine-readable optical code."

Alternatively, radio-frequency electromagnetic fields may be used to transfer data for the purpose of automatically identifying and tracking tags, such as radio frequency identification (RFID) tags, attached to objects. These tags contain electronically stored information and may be attached to a person's clothing or possessions. For example a microchip implant with an identifying integrated circuit may be placed within an object which uses RFID technology. This is also known as a passive integrated transponder tag (PIT tag). These tags may be used to read personally-linked information. Two-way radio transmitter-receivers called interrogators or readers send a signal to the tag and read its response. Near field communications (NFC) may also be used to establish radio communication by touching devices together or bringing them into close proximity. NFC communications, based on existing RFID standards, are possible between an NFC device and a NFC chip also referred to as a tag. These tags may also be used to read personally-linked information. The machine-readable tags may simply be referred to collectively and/or generically as a "machine-readable tag."

While software providing the logic or control for the operations and functions of the invention described herein, may be described in the general context of program modules that execute in conjunction with one or more application programs that run on an operating system on one or more computing devices such as a computer, those skilled in the art will recognize that this disclosure may be implemented in combination with one or more other modules. Generally, the software includes program modules that can include routines, programs, components, data structures, and other types of structures that perform particular tasks or implement particular abstract data types. Moreover, those skilled in the art will appreciate that aspects of the invention may be practiced with various computer system configurations, including mobile devices that are hand-held, multiprocessor systems, microprocessor-based or programmable consumer electronics, minicomputers, mainframe computers, and the like. Aspects of the invention may also be practiced in distributed computing environments where tasks are performed by remote processing devices that are linked through a communications network. In a distributed computing or "cloud" environment, program modules may be located in both local and remote memory storage devices.

In the following detailed description, references are made to the accompanying drawings that form a part hereof and in which are shown by way of illustration specific embodiments or examples. Referring now to the drawings, in which like numerals represent like elements throughout the several figures, aspects of the present disclosure will be presented.

FIG. 1 illustrates a ticketing counter 20 of a commercial airline at a departure location. In FIG. 1, a minor (a person under the age of full legal responsibility) is accompanied by a first adult guardian 22. The minor is referred to as an unaccompanied minor 24 because the unaccompanied minor 24 will be taking a commercial flight from the departure location to a destination location without the first adult guardian 22. The first guardian 22 and the unaccompanied minor 24 interact with the ticketing agent 26 of the commercial airline or associated with the airport. When the unaccompanied minor 24 and the first guardian 22 check in at the ticketing counter 20, the ticketing agent 26 enters information about the unaccompanied minor 24 into a computer system and itinerary information is retrieved from the computer system. The itinerary information includes, but is not limited to, a commercial airline flight of the common carrier, or another common carrier, that includes one or more flight numbers, one or more departure locations such as an airport code, one or more connection locations and/or a final destination location that may be identified by an airport code, dates and times, and number of checked bags and carry-on bags. Alternatively, the itinerary information for the unaccompanied minor 24 can be generated by the ticketing agent 26. The unaccompanied minor information also includes personal information such as, but not limited to, name, address, age, sex, email address, username, and phone number of the unaccompanied minor. The unaccompanied minor information can also include personal information about the first adult guardian at the departure location, and about a second adult guardian at the destination location, such as contact information including name, address, phone number, email address, username, etc. For an elderly, disabled, or other passenger requiring special assistance, the passenger information may include passenger accommodations during travel, such as wheelchairs, special meals, assistance with eating or getting to the restroom, etc. Collectively, the information regarding the unaccompanied minor, disabled or elderly person, or other passenger requiring assistance, including the location of the passenger such as GPS coordinates, is referred to herein as "passenger information."

The ticketing agent 26 generates a machine-readable tag 28 encoded with the passenger information. The machine-readable tag 28 includes, presents or references information such as a computer network address that includes the passenger information, a URL wherein a graphic user interface presents the passenger information referenced by the URL, wherein the graphic user interface includes a web browser interface and wherein the information presented on mobile devices is a web-page corresponding to the URL, or wherein the graphic user interface visually renders the passenger information in a web browser interface. The ticketing agent 26 may also take a photograph 68 (FIG. 3) of the unaccompanied minor 24. The photograph 68 is included as part of the passenger information. In the case of an unaccompanied minor, the passenger information corresponds with unaccompanied minor information.

Figure 2:
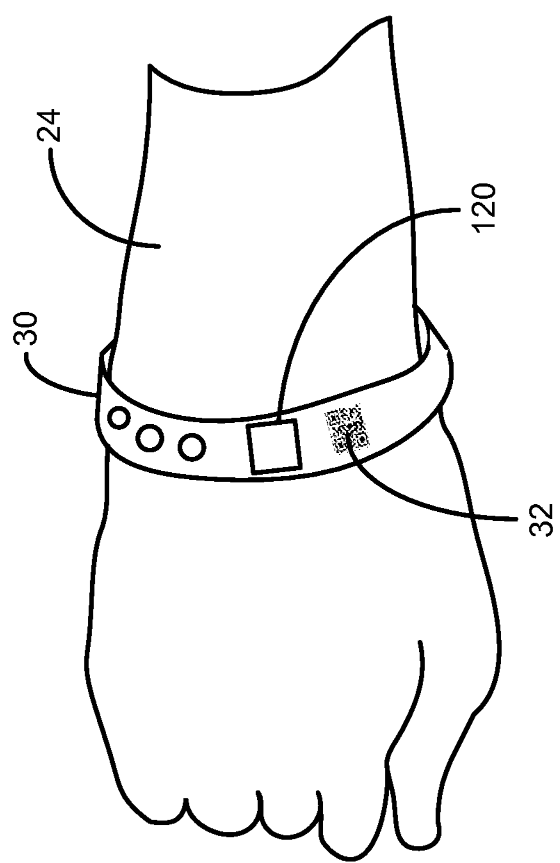
FIG. 2 illustrates a wristband provided to the unaccompanied minor having a Quick Response code (QR code), according to at least one embodiment disclosed herein.
Figure 3:
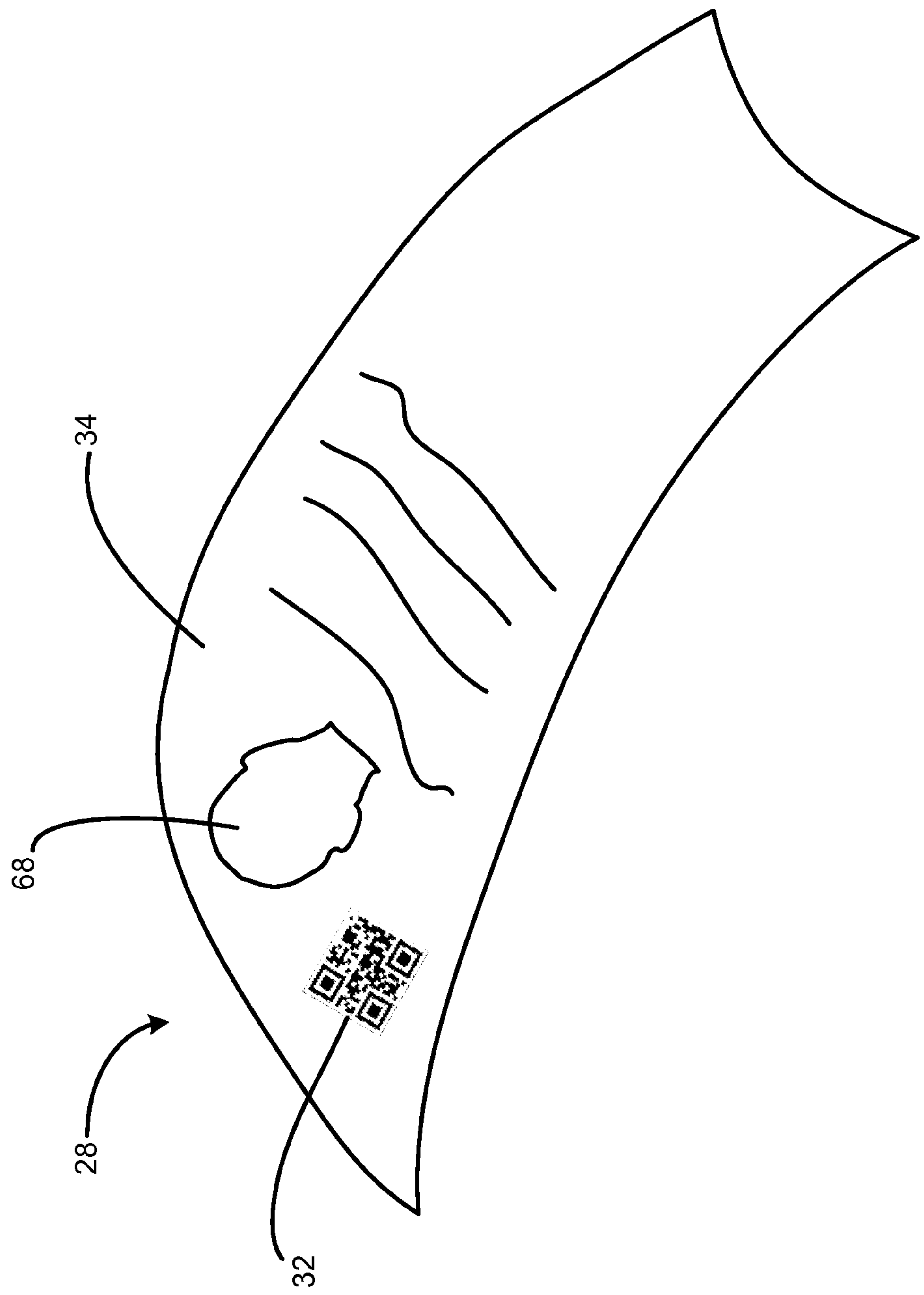
FIG. 3 illustrates an electronic or paper document provided to the unaccompanied minor having a QR code, according to at least one embodiment disclosed herein.

The machine-readable tag 28 is then provided to or otherwise associated with the unaccompanied minor 24. For example, the machine-readable tag 28 is configured as wristband 30 with a QR code 32 to be worn by the unaccompanied minor 24 as shown in FIG. 2. Alternatively, a machine-readable tag 28 may be the QR code 32 on a lanyard, card or on some other device to be worn by the unaccompanied minor 24. Also, as shown in FIG. 3, the machine-readable tag 28 may be an electronic or paper document 34, with encoded or embedded passenger information such as the QR code 32, for example, carried or accessible by or for the unaccompanied minor 24. The electronic or paper document 34 may include any electronic media content that is intended to be used in an electronic form such as text, graphics or spreadsheets generated by software and stored on magnetic or optical media, as well as electronic mail and documents transmitted in electronic data interchange, and may contain information as hypertext connected by hyperlinks.

Figure 4:
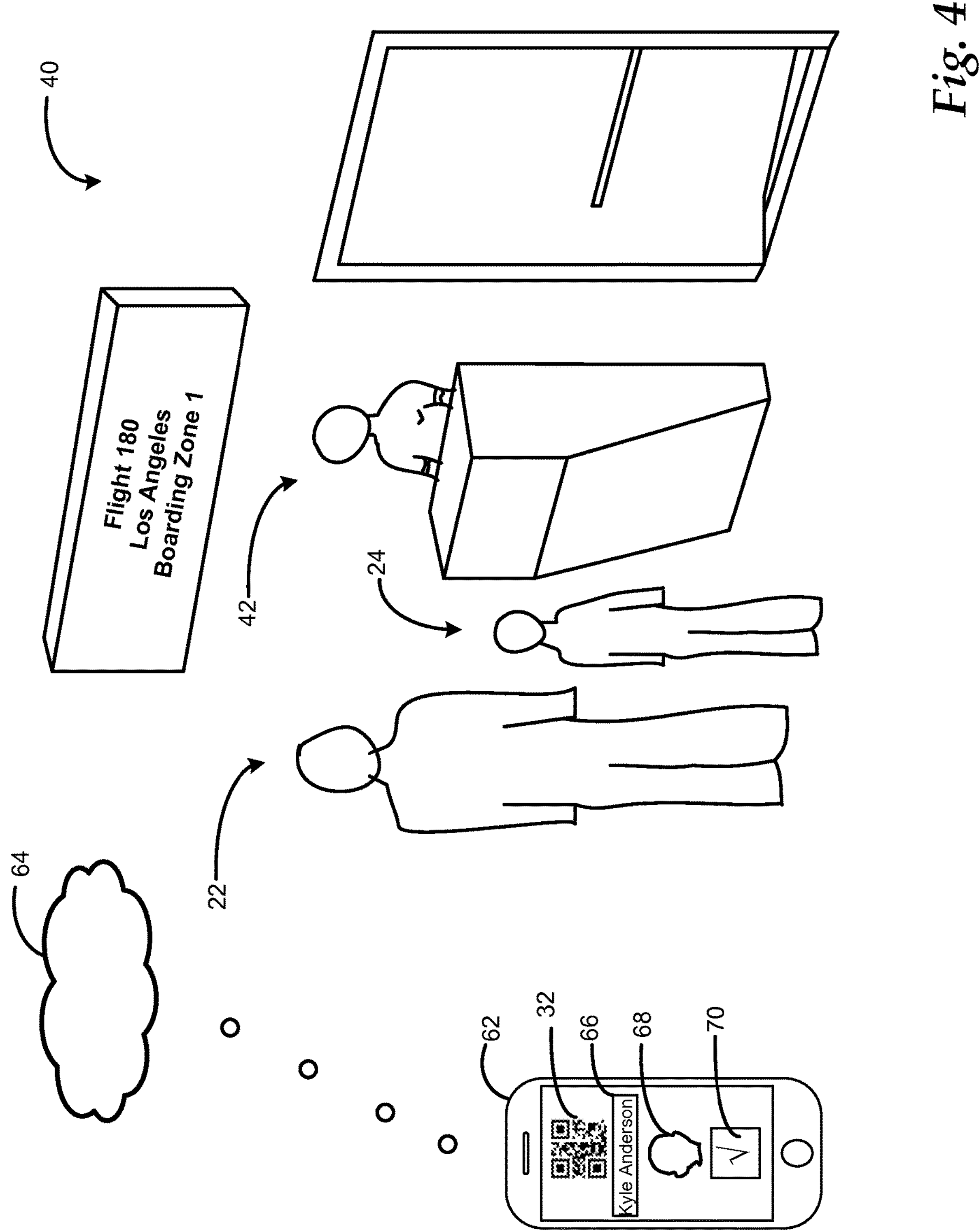
FIG. 4 illustrates the unaccompanied minor and the first adult guardian at a departure gate along with the transfer of responsibility for the unaccompanied minor from the guardian to the carrier gate agent occurring via the gate agent's mobile device, according to at least one embodiment disclosed herein.

The ticketing agent 26 inputs or verifies portions or all of the passenger information with the passenger and/or the first adult guardian 22, and then the unaccompanied minor 24 is escorted to the departure gate 40 corresponding with the flight to be taken by the unaccompanied minor 24 from the departure location. FIG. 4 illustrates the unaccompanied minor 24 and the first adult guardian 22 at the departure gate 40. Responsibility for the unaccompanied minor 24 is transferred from the first adult guardian 22 to a first agent or gate agent 42 of the commercial airline or the airport at the departure location. It should be appreciated that the transfer of responsibility for the unaccompanied minor 24 from the first adult guardian 22 at the departure gate 40 through the entire itinerary to a second adult guardian 52 at the destination location will be shown and described generally with respect to FIGS. 4-7 before returning to FIG. 4, below for a more detailed discussion of the process and associated technology.

Figure 5:
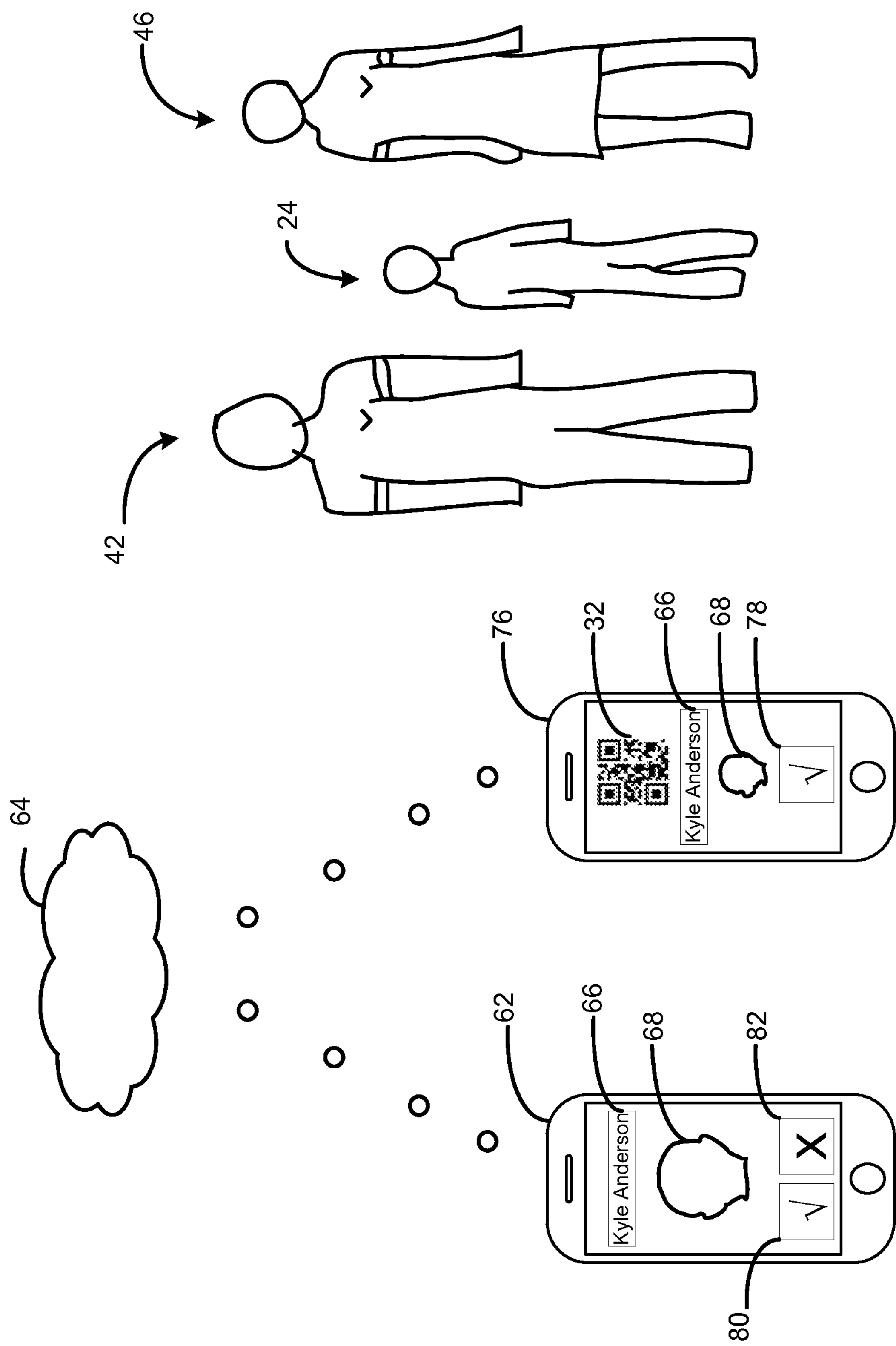
FIG. 5 illustrates the transfer of responsibility for the unaccompanied minor from the gate agent's mobile device to the to the flight attendant's mobile device onboard an aircraft, according to at least one embodiment disclosed herein.
Figure 6:
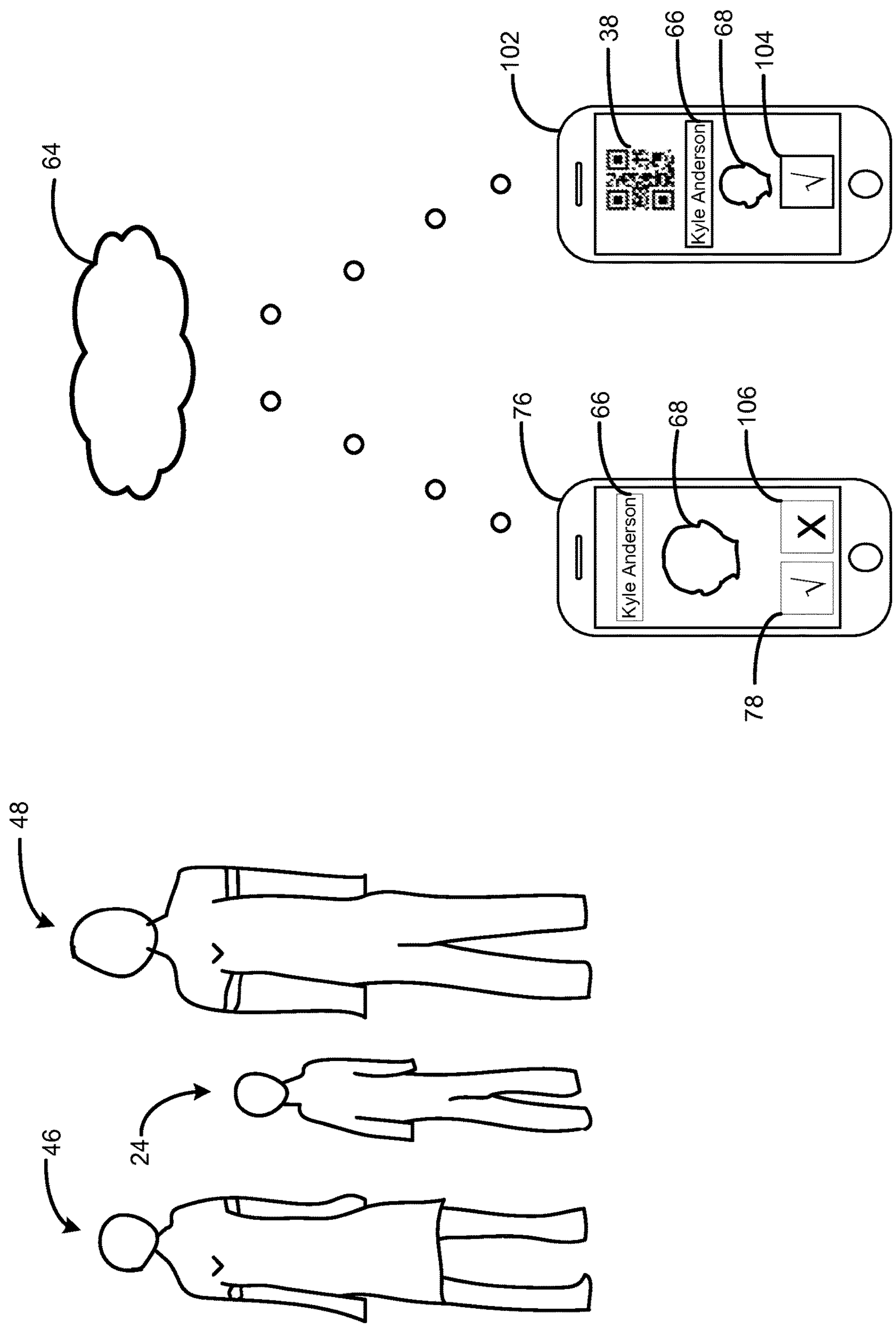
FIG. 6 illustrates the transfer of responsibility for the unaccompanied minor from the flight attendant's mobile device to the destination or connection gate agent's mobile device, according to at least one embodiment disclosed herein.
Figure 7:
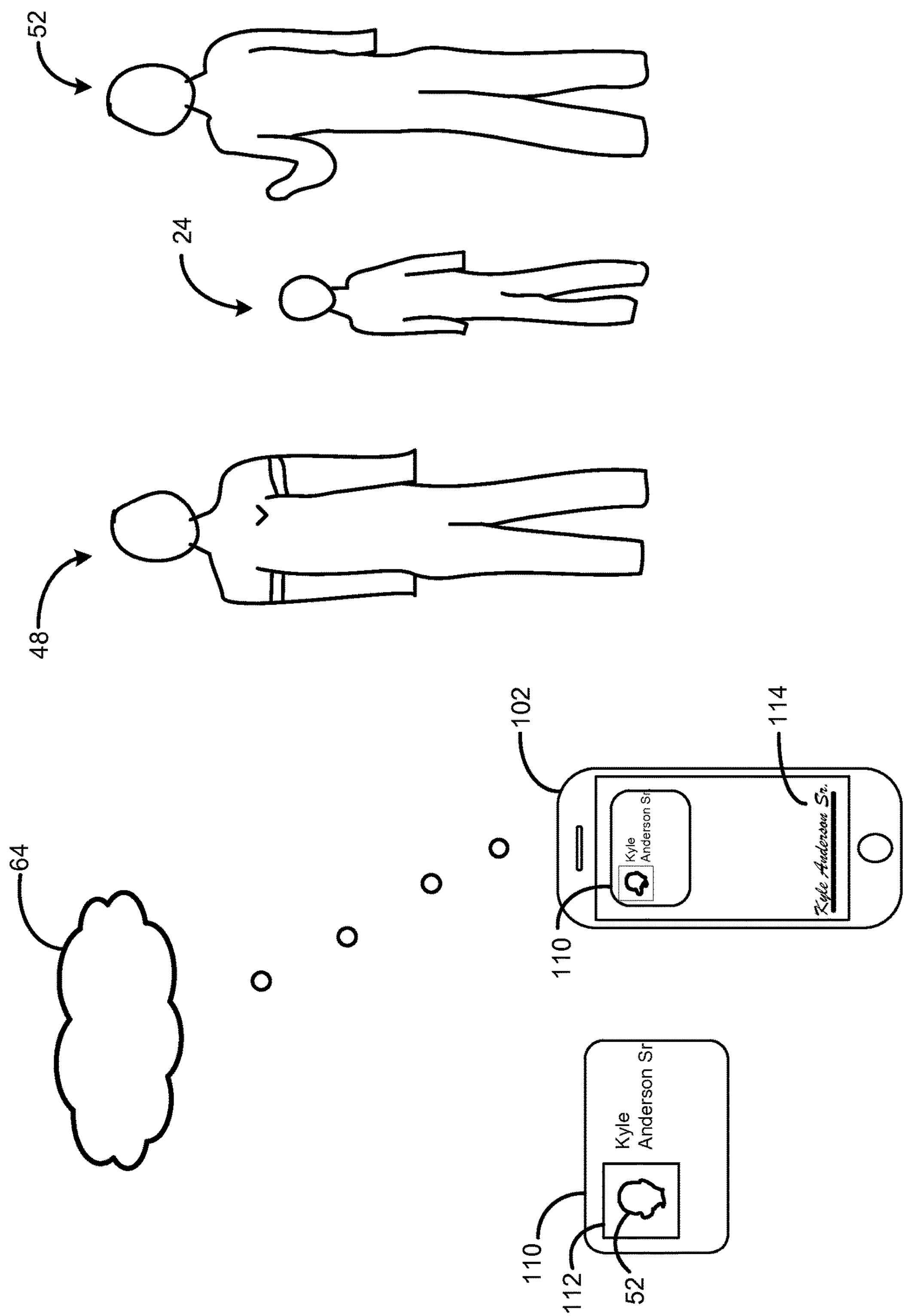
FIG. 7 illustrates the transfer of responsibility for the unaccompanied minor from the destination gate agent's mobile device to a second adult legal guardian at the unaccompanied minor's destination, according to at least one embodiment disclosed herein.

FIG. 5 illustrates the gate agent 42, with the unaccompanied minor 24, and a second agent or flight attendant 46 at the departure gate 40 or onboard the aircraft scheduled to take the unaccompanied minor 24 to the destination location or one or more connection locations. The transfer of responsibility for the unaccompanied minor 24 is made from the gate agent 42 to the flight attendant 46, as described in greater detail below. FIG. 6 illustrates the flight attendant 46, with the unaccompanied minor 24, and a third agent or gate agent 48 at the destination or connection location. The transfer of responsibility for the unaccompanied minor 24 is made from the flight attendant 46 to the gate agent 48, as described in greater detail below. FIG. 7 illustrates the gate agent 48, with the unaccompanied minor 24, and the second adult guardian 52. The transfer of responsibility for the unaccompanied minor 24 is made from the destination gate agent 48 to the second adult guardian 52 at the destination location, as described in greater detail below.

Returning now to FIG. 4, the process and associated technology for the transfer of responsibility will now be described. To authorize transferring responsibility of a passenger requiring assistance, such as the unaccompanied minor 24, to the first agent or the gate agent 42, a first mobile device 62 with a software application for reading or scanning barcodes such as the QR code 32 is used. The gate agent 42 optically reads or scans the QR code 32 on the wristband 30 of the unaccompanied minor 24 with the first mobile device 62. The software application on the mobile device decodes the QR code 32 and the QR code 32 links to a hosted web service 64 that transfers the decoded unaccompanied minor information on to the first mobile device 62. The first adult guardian 22 of the unaccompanied minor 24 then navigates a user interface displayed on the first mobile device 62 of the gate agent 42 for the first adult guardian 22 to authorize transfer of responsibility for the unaccompanied minor to the gate agent 42. For example, the first mobile device 62 shown in FIG. 4 displays the QR code 32 along with the name 66 and photograph 68 of the unaccompanied minor 24. The first adult guardian 22 can press a user interface button 70 to authorize the transfer of responsibility for the unaccompanied minor 24 to the gate agent 42 or, uses other means, for example placing a finger signature on the first mobile device 62, to transfer responsibility for the unaccompanied minor 24 to the gate agent 42. The signature is then stored on the hosted web service 64 that may be configured to handle signature authority. If the passenger is an adult, the passenger may carry out the transfer functions with the carrier agents.

Upon boarding the aircraft, responsibility for the unaccompanied minor 24 is transferred from the gate agent 42 to the flight attendant 46, as shown in FIG. 5. The transfer of responsibility from the gate agent 42 to the flight attendant 46 is performed by using the first mobile device 62 of the gate agent 42 and a second mobile device 76 of the flight attendant 46. The second mobile device 76 also includes a software application for reading or scanning the QR code 32 on the wristband 30 of the unaccompanied minor 24. The flight attendant 46 optically reads or scans the QR code 32 and then decodes the QR code 32 to link to the hosted web service 64. The hosted web service transfers the stored unaccompanied minor information on to the mobile device 76 of the flight attendant 46. The second mobile device 76 of the flight attendant 46 displays the QR code 32 along with the name 66 and photograph 68 of the unaccompanied minor 24.

Upon receiving the unaccompanied minor information of the unaccompanied minor 24, the flight attendant 46 is prompted by the user interface on the second mobile device 76 to accept responsibility for the unaccompanied minor 24. The flight attendant 46 navigates the user interface on the mobile device 76 and, upon the flight attendants acceptance by pressing the user interface button 78, the gate agent 42 is then prompted by the user interface on the first mobile device 62 of the gate agent 42 to accept or deny the request of the flight attendant 46 to transfer responsibility for the unaccompanied minor 24. The gate agent 42 navigating the user interface to authorize the transfer of responsibility to the flight attendant 46 for the unaccompanied minor 24 by pressing the user interface button 80 or deny authorization by pressing user interface button 82 such as in the event the flight becomes delayed, is canceled, or in the event the flight's departure gate is changed. When the flight attendant 46 and the gate agent 42 accept, information regarding their authorization and acceptance of the transfer of responsibility of the unaccompanied minor 24 is transferred from the first and second mobile devices 62, 76 and stored on the web service 64. In one or more configurations, digital signatures of the flight attendant 46 and the gate agent 42 are stored on the hosted web service 64.

Figures 8A, 8B, 8C:
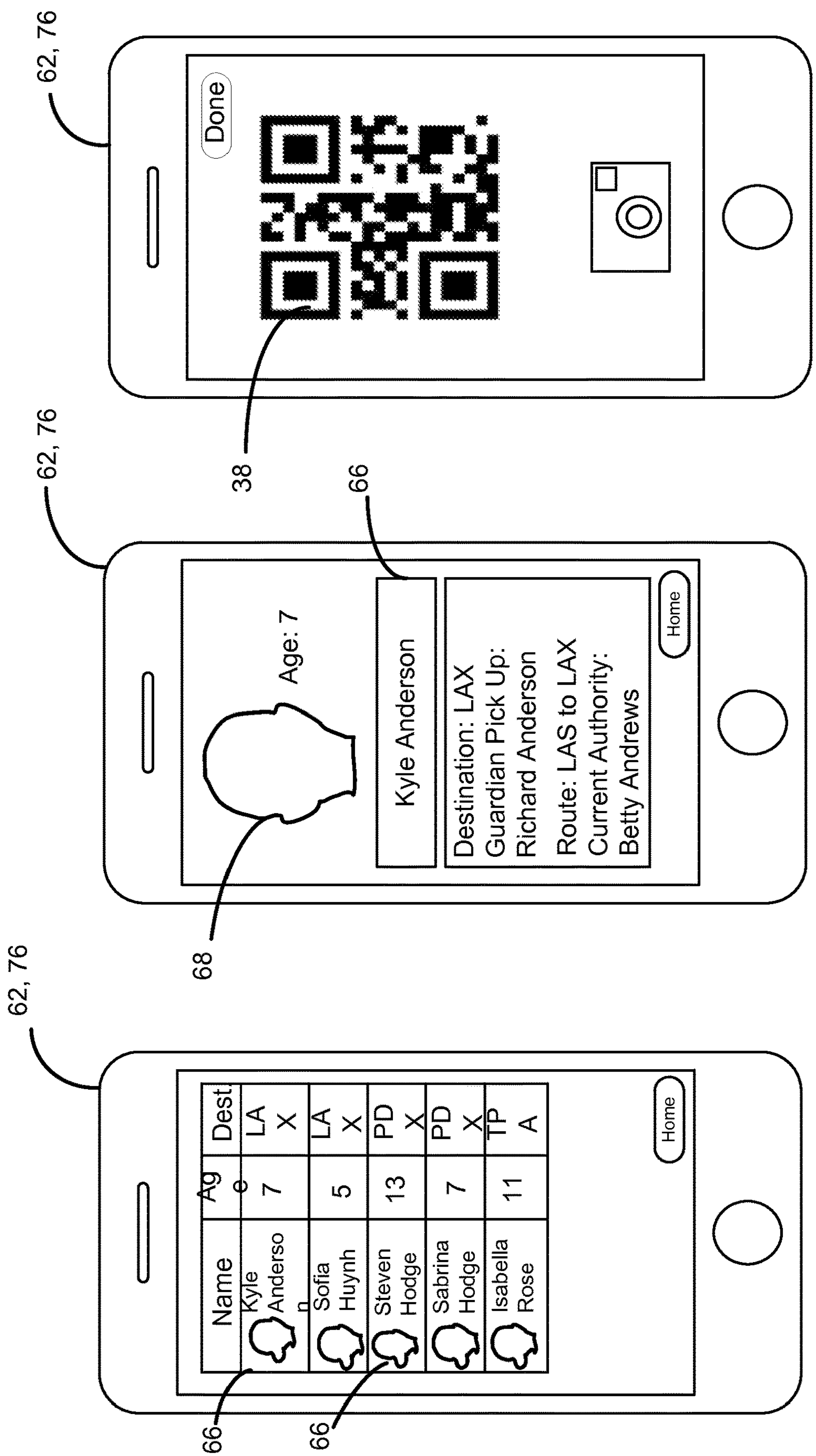
FIG. 8A illustrates an onscreen list of unaccompanied minors on either a gate agent's or flight attendant's mobile device, according to at least one embodiment disclosed herein.
FIG. 8B illustrates onscreen passenger itinerary information and responsibility status regarding one of the unaccompanied minors listed on the mobile device of FIG. 8A, according to at least one embodiment disclosed herein.
FIG. 8C illustrates a picture of another QR code displayed on a mobile device, in the event that wristband with the original QR code is lost, according to at least one embodiment disclosed herein.

FIG. 8A illustrates an onscreen list on either the gate agent's or flight attendant's mobile device 62, 76 for all of the unaccompanied minors 24 for which the gate agent 42 or the flight attendant 46 has responsibility at a given time. FIG. 8B illustrates onscreen itinerary information, the current responsibility status, and the name of the second adult guardian 52 at the destination location, for one of the unaccompanied minors 24 listed on the mobile device of FIG. 8A. The photograph 68 of an unaccompanied minor 24 may be updated upon the occurrence of each transfer of responsibility of an unaccompanied minor 24 to confirm that the same unaccompanied minor 24 is accompanied by a carrier agent and to indicate or verify the current physical state, status or location of the unaccompanied minor 24 during travel. Thus, if a later taken photograph does not match the earlier photograph, the carrier agent(s) can investigate further to ensure the passenger is the initial passenger. For example, the passenger information may include a first photograph of the passenger such as the unaccompanied minor 24 taken at first location such as the departure location and a second photograph of the unaccompanied minor 24 taken at a second location such as the destination location. Upon arriving at the destination location or after travel has been completed, for example, the first and second photographs may be compared to confirm the identity of the unaccompanied minor 24 and that the unaccompanied minor 24 made the trip successfully between the departure and destination locations.

In the event of an internet connection failure or the unaccompanied minor loses the wristband 30 with the QR code 32, the flight attendant 46 may use the mobile device 76 to take a photograph of the gate agent's mobile device 62 which has generated and is displaying a more complex and dynamically generated code, such as a new QR code 86, as shown in FIG. 8C. The QR code 86 contains embedded information for referencing, retrieving, accessing or presenting the unaccompanied minor information of the unaccompanied minor 24. The flight attendant 46 optically reads and decodes the QR code 86 for the unaccompanied minor information that would have typically been downloaded from the hosted web service 64. Thus, in the event of an internet connection failure or the loss of the wristband 30 with the QR code 32, the new QR code 86 provides the information regarding authorization to transfer responsibility and acceptance of responsibility for the unaccompanied minor 24 that is transferred between the first and second mobile devices 62, 76 and that could be subsequently synchronized and stored with the hosted web service 64 when an internet connection becomes available.

Figures 9A, 9B, 9C:
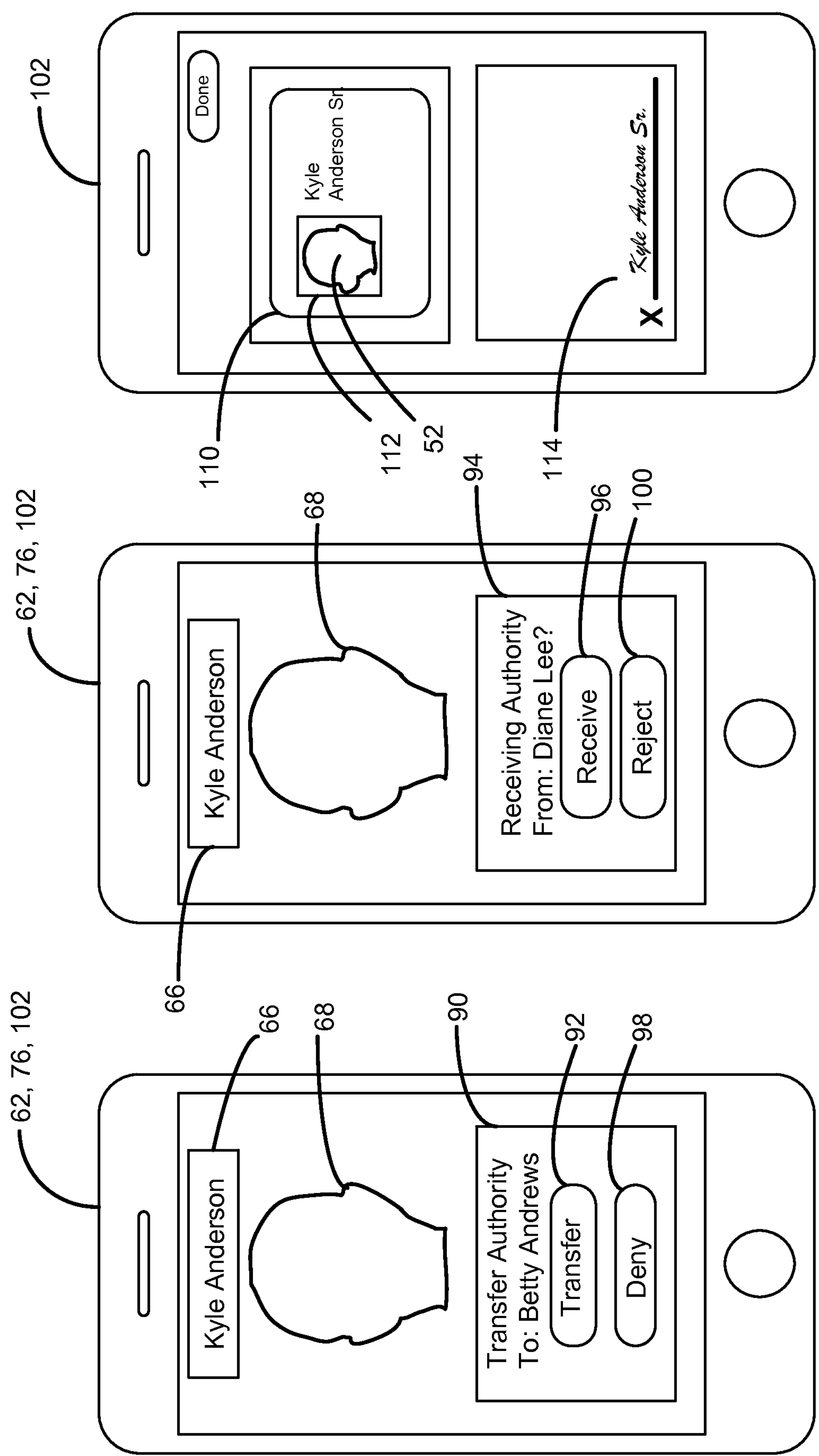
FIG. 9A illustrates the authorization of the transfer of responsibility of the unaccompanied minor from the departure gate agent or from the flight attendant via a mobile device, according to at least one embodiment disclosed herein.
FIG. 9B illustrates the acceptance of the transfer of responsibility of the unaccompanied minor to the flight attendant or to the connection or destination gate agent, according to at least one embodiment disclosed herein.
FIG. 9C illustrates the transfer of responsibility for the unaccompanied minor to the destination adult guardian by capturing a photograph of the destination guardian's identification and the destination guardian's signature, according to at least one embodiment disclosed herein.

FIGS. 9A and 9B illustrate alternative user interfaces for mobile devices such as the first and second mobile devices 62, 76. Interacting with the user interface 90 of FIG. 9A by pressing the user interface button 92 authorizes transfer of responsibility for the unaccompanied minor 24, identified by the name 66 and depicted in the photograph 68, from the gate agent 42 to the flight attendant 46. Interacting with the user interface 94 of FIG. 9B by pressing the user interface button 96 accepts transfer of responsibility for the unaccompanied minor 24 from the gate agent 42 to the flight attendant 46 or to a connection or the destination gate agent. In one or more configurations, either of the user interfaces 90, 94 may also include user interface buttons 98, 100 which could be pressed to deny authorization or reject acceptance for the transfer of the unaccompanied minor 24. For example, if the photograph 68 does not match or correspond with the unaccompanied minor 24, then either the gate agent or the flight attendant 46 could deny or reject transfer of the unaccompanied minor 24.

As mentioned above, FIG. 6 illustrates the flight attendant 46, with the unaccompanied minor 24, and a third agent or gate agent 48 at the destination location. Alternatively, FIG. 6 could instead illustrate a connection location where the originating flight arrives, prior to arriving at the final destination location. In such case, gate agent 48 may transfer responsibility to one or more other flight attendants or gate agents depending on the number of connecting flights needed to deliver the unaccompanied minor to the destination location. Upon arrival, the transfer of responsibility for the unaccompanied minor 24 from the flight attendant 46 to the gate agent 48 is similar to the other transfers of responsibility described above. The transfer of responsibility from the flight attendant 46 to the gate agent 48 is performed by using the mobile device 76 of the flight attendant 46 and a third mobile device 102 of the gate agent 48. The mobile device 102 also includes an application for reading or scanning the QR code 32 on the wristband 30 of the unaccompanied minor 24. The gate agent 48 optically reads or scans the QR code 32 and then decodes the QR code 32 to link to the hosted web service 64. The hosted web service 64 transfers the stored unaccompanied minor information on to the mobile device 102 of the gate agent 48. The mobile device 102 of the gate agent 48 displays the QR code 32 along with the name 66 and photograph 68 of the unaccompanied minor 24.

Upon receiving the unaccompanied minor information of the unaccompanied minor 24, the gate agent 48 is prompted by the user interface on the mobile device 102 to accept responsibility for the unaccompanied minor 24. The gate agent 48 navigates the user interface on the mobile device 102 and, upon the gate agent's acceptance by pressing the user interface button 104, the flight attendant 46 is then prompted by the user interface on the mobile device 76 to accept or deny the request of the gate agent 48 to transfer responsibility for the unaccompanied minor 24. The flight attendant 46 navigates the user interface to authorize the transfer of responsibility to the gate agent 48 for the unaccompanied minor 24 by pressing the user interface button 78 or deny authorization by pressing user interface button 106. When the flight attendant 46 and the gate agent 48 accept, information regarding their authorization and acceptance of the transfer of responsibility of the unaccompanied minor 24 is transferred from the mobile devices 76, 102 and stored on the hosted web service 64. Digital signatures of the flight attendant 46 and the gate agent 48 may be stored on the hosted web service 64.

As mentioned above, FIG. 7 illustrates the third agent or second gate agent 48, with the unaccompanied minor 24, and the second adult guardian 52 at the destination location. The first adult guardian 22 can provide a photograph 112 of the second adult guardian 52 so that the second gate agent or other can quickly identify and/or verify the identity of the second adult guardian 52. Transferring responsibility of the unaccompanied minor 24 from the gate agent 48 to the second adult guardian 52 occurs by the gate agent 48 scanning the identification 110 of the second adult guardian 52 with the mobile device 102. The second adult guardian 52 interfaces with the gate agent's mobile device 102 to accept transfer of responsibility for the unaccompanied minor 24 from the gate agent 48. FIG. 9C illustrates the transfer of responsibility of the unaccompanied minor 24 to the second adult guardian by capturing a photograph 112 of the second adult guardian's identification 110. The second adult guardian 52 can accept responsibility for the unaccompanied minor by interacting with the user interface of the mobile device 102 such as pressing a user interface button or providing a digital signature 114 which is transmitted to and stored by the hosted web service 64.

In one or more configurations, upon each occurrence of a transfer of responsibility for a passenger requiring assistance, a notification may be sent to the first and/or second adult guardians 22, 52. The notifications may be sent by text, email or some other suitable communication method, including by telephone. Also, during or after the flight, a report may be generated and stored or transmitted that identifies each occurrence of a transfer of responsibility, each occurrence of authorizing transfer of responsibility, each occurrence of acceptance of transfer of responsibility, identifies each agent of the common carrier or the airport that had or has responsibility for the passenger requiring assistance, and identifies the adult guardians 22, 52, along with the associated dates, times, locations, and flight information. Also a map may be generated corresponding with the flight path of the flight or flights taken by the passenger requiring assistance where the agents having had responsibility for the passenger requiring assistance are identified along each portion of the flight path. In one or more configurations, a code, symbol, or URL such as a machine-readable tag is sent or passed to the agents or the one or both of the adult guardians 22, 52 where the code is accessed, displayed, decoded, decrypted prior to receiving responsibility for the passenger requiring assistance. Information stored on the hosted web service 64 may be stored for a particular period of time. For example, the information may be stored for the period of time required to confirm the unaccompanied minor 24 completed travel successfully or for as long as required by the commercial airline's document retention policy.

Figure 10:
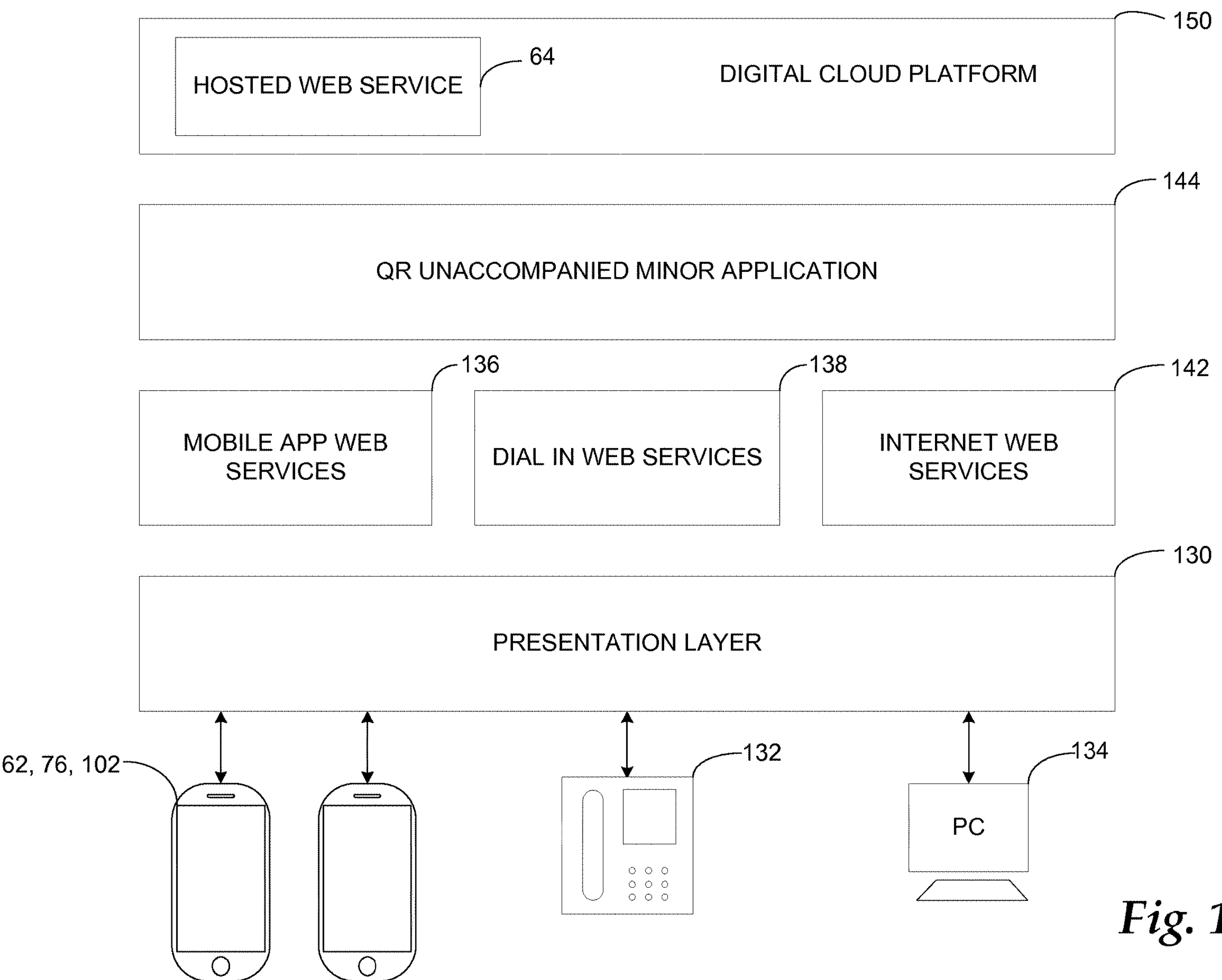
FIG. 10 illustrates one configuration of an architecture implementing the transfers of responsibility of a passenger requiring assistance, utilizing the devices, applications, and functions of a network-based service through a digital cloud platform, according to at least one embodiment disclosed herein.

FIG. 10 illustrates a configuration of an architecture for transferring responsibility of a passenger requiring assistance, such as an unaccompanied minor 24, of a common carrier. Presentation layer 130 corresponds with the layer 6 of the seven-layer Open Systems Interconnect (OSI) model of computer networking and serves as the data translator for the mobile devices 62, 76, 102, landline phone 132, and personal computer (PC) 134. Presentation layer 130 delivers and formats information to the application layer/layer 7 which includes mobile application web services 136, dial in web services 138, and internet web services 142. Also included is the QR passenger application 144 which may be referred to simply as a QR reader application. The devices, applications, and functions described herein in association with network-based services such as the hosted web service 64 through a digital cloud platform 150 such as the internet.

Figure 11:
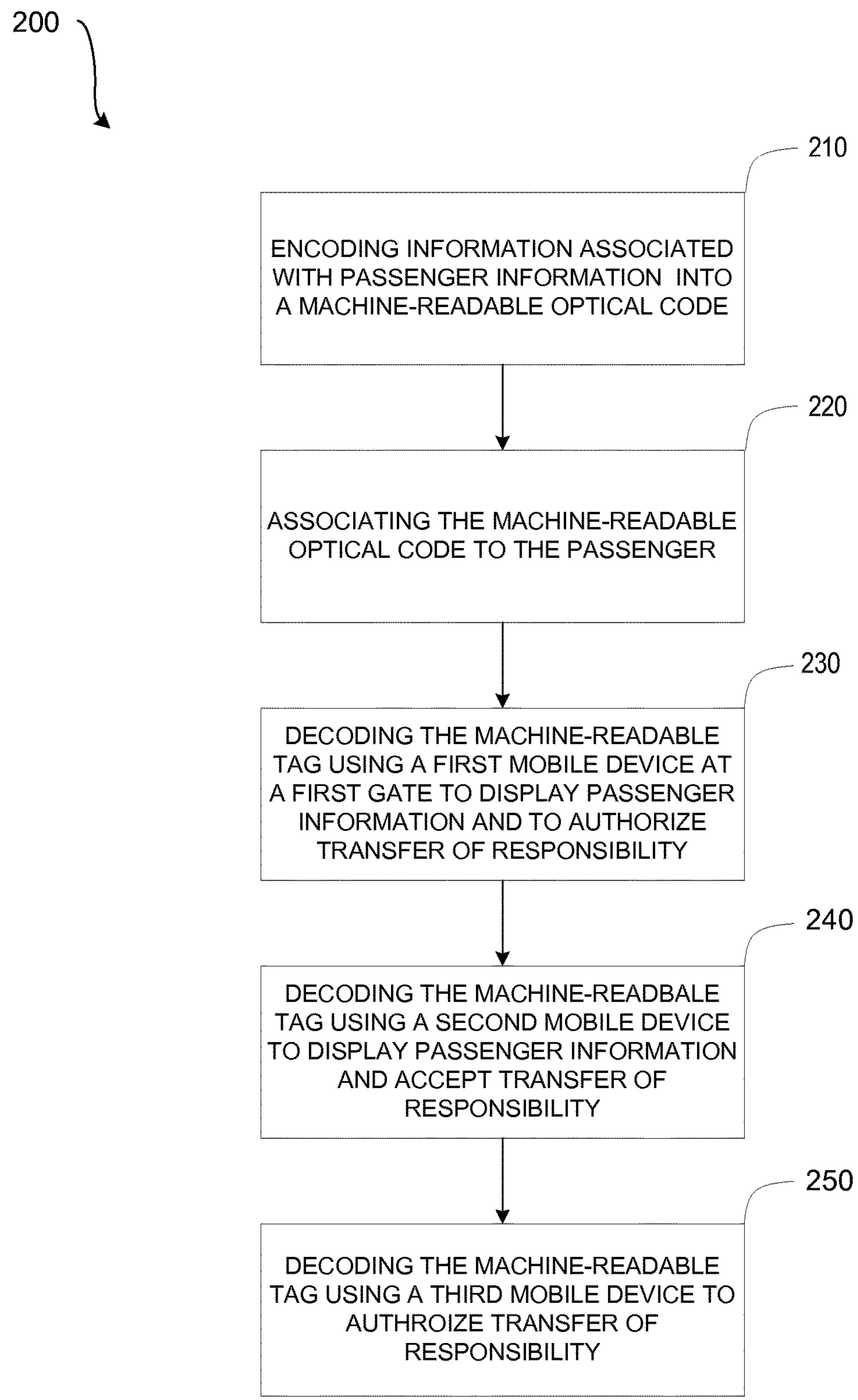
FIG. 11 illustrates one configuration of a method for transferring responsibility of a passenger requiring assistance on a common carrier, according to at least one embodiment disclosed herein.

FIG. 11 illustrates a method 200 for method for monitoring a passenger requiring assistance, such as an unaccompanied minor 24, on a common carrier. Unless otherwise indicated, more or fewer operations may be performed than shown in the figures and described herein. Additionally, unless otherwise indicated, these operations may also be performed in a different order than those described herein.

The method 200 starts at operation 210 with encoding information associated with passenger information of the passenger requiring assistance on to a machine-readable tag at a travel departure location. Operation 220 includes associating the machine-readable tag to the passenger. Operation 230 includes decoding the machine-readable tag using a first mobile device at a first gate of the common carrier to display the passenger information on the first mobile device, to authorize transfer of responsibility for the passenger to the first gate agent, and to authorize transfer of responsibility for the passenger from the first gate agent to a flight attendant. Operation 240 includes decoding the machine-readable tag using a second mobile device of the flight attendant to display the passenger information on the second mobile device, and to accept transfer of responsibility for the passenger from the first gate agent to the flight attendant, wherein the machine-readable tag includes a URL and wherein a graphic user interfaces on the first and second mobile devices display the passenger information accessed with the URL. Operation 250 includes decoding the machine-readable tag using a third mobile device of a third gate agent at a destination location to authorize transfer of responsibility for the passenger from the flight attendant to the third gate agent at the destination location.

The method 200 may also include the operation of authorizing transfer of responsibility of the passenger to the first agent by reading the machine-readable tag with a mobile device 62 of the first agent, decoding the machine-readable tag, presenting the passenger information on the mobile device 62 of the first agent, and the first adult guardian 22 of the passenger at a departure location interfacing with the mobile device 62 of the first agent for the first adult guardian 22 to authorize transfer of responsibility for the passenger to the first agent.

The method 200 may also include the operation of authorizing transfer of responsibility of the passenger from the first agent to the second agent by interfacing with the mobile device 62 of the first agent for the first agent to authorize transfer of responsibility for the passenger to the second agent, and transferring information regarding the transfer of responsibility from the first agent from the mobile device 62 of the first agent.

The method 200 may also include the operation of accepting transfer of responsibility of the passenger from the first agent to the second agent by reading the machine-readable tag with the mobile device 76 of the second agent, decoding the machine-readable tag to present the passenger information on the mobile device 76 of the second agent, and interfacing with the mobile device 76 of the second agent for the second agent to accept responsibility for the passenger.

The method 200 may also include the operations authorizing transfer of responsibility of the passenger from the second agent to a third agent of the common carrier and accepting transfer of responsibility of the passenger from the second agent to the third agent. The operation of authorizing transfer of responsibility of the passenger from the second agent to the third agent includes interfacing with the mobile device 76 of the second agent for the second agent to authorize transfer of responsibility for the passenger to the third agent, and transferring information regarding the transfer of responsibility from the second agent from the mobile device 76 of the second agent. The operation of accepting transfer of responsibility of the passenger from the second agent to the third agent includes reading the machine-readable tag with the mobile device 102 of the third agent, decoding the machine-readable tag to present the passenger information on the mobile device 102 of the third agent, and interfacing with the mobile device 102 of the third agent for the third agent to accept responsibility for the passenger. The method 200 can also include the operation of storing acceptance of the transfer of responsibility of the passenger to the second agent on the hosted web service 64.

In one or more configurations, the ticketing agent 26 may provide a global positioning system (GPS) transponder 120 to the passenger, designed for use with a GPS system. For example, FIG. 2 illustrates the wristband 30 with the QR code 32 and a GPS transponder 120 provided to the unaccompanied minor 24. The GPS system is a satellite-based radio navigation system capable of determining continuous position, velocity, time, and direction information for the passenger. Based on the precise orbits of the GPS satellites, GPS satellites can relay their location to any number of GPS transponders 120 provided to any number of passengers. The GPS transponder 120 can be equipped to receive GPS data by scanning radio frequencies for GPS satellite signals. Upon a GPS transponder 120 receiving a radio signal from a GPS satellite, the GPS transponder 120 can determine the precise location of that satellite via one of different conventional methods. The GPS transponder continues scanning for signals until it has acquired at least three different satellite signals. Implementing geometrical triangulation, the GPS transponder 120 utilizes the three known positions to determine its own two-dimensional position relative to the satellites. Alternatively, other global navigation satellite systems (GNSS), local positioning systems, cellular base stations, Wi-Fi access points, or radio broadcast towers may be used for locating the passenger.

Although GPS enabled devices are often used to describe navigational devices, it will be appreciated that satellites need not be used to determine a geographic position of a receiving unit, since any receiving device capable of receiving the location from at least three transmitting locations can perform basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the transponder. In this way, the location of the passenger with the GPS transponder 120 can be determined. GPS coordinates of the passenger may be transmitted from with a transmitter across a cellular or wireless network to one or more of the mobile devices 62, 76, 102 or a central station so that the passenger can be readily located geographically.

The gate agents 42, 48 or the flight attendant 46 may determine the location of the passenger such as when the passenger is separated from an escorting agent or guardian. The transmission of information identifying the location of the GPS transponder 120, such as GPS coordinates, may be initiated by the gate agents 42, 48 and the flight attendant 46 interfacing with GPS software on the mobile devices 62, 76, 102. The information identifying the geographical location of the GPS transponder 120 may be transmitted continuously. The availability of a continuous signal may be limited by available power. The information identifying the location of the GPS transponder 120 may also be transmitted intermittently. An intermittent signal at appropriately short intervals can be used to conserve power.

The GPS transponder 120 has numerous capabilities and options, including capabilities for analog or digital signal processing, transmitting, and receiving. Components of the GPS transponder 120 may include, but are not limited to, a power source such as a battery, an antenna, a receiver, a transmitter, and a microprocessor. Power may also be supplied by other means, for example, by mechanical motion or a battery charger. The GPS transponder 120 may also contain a GPS system antenna, and may also contain additional types of antennas, for example, a cellular telephone antenna, radio antenna, etc., depending on how information and data is desired to be exchanged with the GPS system, a monitoring station, the mobile devices 62, 76, 102, etc. The GPS transponder 120 may receive information via a GPS processor, cellular telephone receiver, radio receiver, signal generator, and the like.

The GPS transponder 120 may be securely attached to the passenger or incorporated into a wearable article. Examples of a wearable article include, but are not restricted to, an article of clothing, a shoe, a watch, the wristband 30, a bracelet, an identification card, an article of jewelry, a hair accessory, and eyeglasses.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A system for monitoring a passenger requiring assistance during travel on a common carrier, the system comprising:

a first computing device disposed at a departure location for the passenger, the first computing device configured to:
  receive identification information that identifies the passenger;
  generate, using the identification information, a machine-readable tag for a body-worn article, the machine-readable tag comprising a first machine-readable optical code comprising encoded passenger information such that the machine-readable tag is associated with the passenger;
  acquire, using a first visual sensor of the first computing device, a first photograph of the passenger; and
  communicate the first photograph to a hosted web service;

a first mobile device carried by a first agent of the common carrier, the first mobile device configured to:
  communicatively couple with the body-worn article as worn by the passenger;
  decode the encoded passenger information of the first machine-readable optical code;

using the decoded passenger information, retrieve itinerary information from the hosted web service, the itinerary information having a predefined association with the passenger;

acquire, using a second visual sensor of the first mobile device, a second photograph of the passenger;

receive a confirmation of an identity of the passenger, wherein the confirmation is based on a comparison of the first photograph and the second photograph;

display a first user interface on a visual display of the first mobile device, the first user interface being based on the confirmation and comprising at least a portion of the decoded passenger information and at least a portion of the itinerary information;

receive, while displaying the user interface on the visual display, a first input authorizing a first transfer of responsibility for the passenger to the first agent;

responsive to authorizing the first transfer of responsibility, attempt to communicate with the hosted web service to update responsibility information to reflect the first agent, the responsibility information having a predefined association with the passenger; and display, responsive to determining an unavailability of the machine-readable tag or of the hosted web service, a second user interface on the visual display of the first mobile device, the second user interface comprising a second machine-readable optical code that includes more encoded information than the first machine-readable optical code, wherein the encoded information of the second machine-readable optical code includes at least the updated responsibility information; and a second mobile device carried by a second agent of the common carrier, the second mobile device configured to: (1) communicatively couple with one of the body-worn article and the first mobile device, (2) decode one of the first machine-readable optical code and the second machine-readable optical code, (3) retrieve, based on which of the first machine-readable optical code and second machine-readable optical code is decoded, the updated responsibility information from one of the hosted web service and the second machine-readable optical code, and (4) present at least the updated responsibility information on a visual display of the second mobile device.

2. The system of claim 1, wherein the encoded passenger information includes at least a portion of the itinerary information of the passenger.

3. The system of claim 1, wherein the encoded passenger information includes passenger accommodations during travel.

4. The system of claim 1, wherein the body-worn article further comprises transmitter circuitry, and wherein one or both of the first mobile device and the second mobile device comprises software configured to determine location information for the passenger using signals transmitted by the transmitter circuitry.

5. The system of claim 1, wherein the encoded passenger information comprises a uniform resource locator (URL) for the hosted web service.

6. The system of claim 1, wherein the first mobile device is further configured to:

receive, responsive to a request received from the second mobile device for a second transfer of responsibility to the second agent, a second input from the first agent to authorize the second transfer of responsibility; and responsive to authorizing the second transfer of responsibility, communicate with the hosted web service to update the responsibility information to reflect the second agent.

7. The system of claim 6, wherein the second mobile device is further configured to:

prompt, upon decoding the encoded passenger information of the machine-readable tag, the second agent to request the second transfer of responsibility; and transmit, responsive to a third input received from the second agent, the request for the second transfer of responsibility to the hosted web service.

8. The system of claim 1, further comprising a third mobile device of a third agent of the common carrier, the third mobile device configured to:

decode the encoded passenger information of the machine-readable tag; and request a second transfer of responsibility for the passenger, the second transfer of responsibility from the second agent to the third agent.

9. The system of claim 8, wherein the third agent and an adult guardian of the passenger are located at a destination location, and wherein the third mobile device is further configured to:

receive a second input from the adult guardian of the passenger, the second input authorizing a third transfer of responsibility for the passenger from the third agent to the adult guardian; and responsive to authorizing the third transfer of responsibility, communicate with the hosted web service to update the responsibility information to reflect the adult guardian.

10. The system of claim 9, wherein one or both of (1) the encoded passenger information and (2) the hosted web service includes first image information including the adult guardian, and wherein receiving a second input comprises:

capturing, using a visual sensor of the third mobile device, second image information including the adult guardian; and performing image processing using the first image information and the second image information to confirm an identity of the adult guardian.

11. The system of claim 8, wherein the first agent is a gate agent for a commercial airline at the departure location of the passenger, wherein the second agent is a flight attendant for the commercial airline, and wherein the third agent is a second gate agent for the commercial airline at a destination location of the passenger.

12. The system of claim 8, wherein the first agent is a gate agent for a commercial airline at the departure location of the passenger, wherein the second agent is a flight attendant for the commercial airline, and wherein the third agent is a second gate agent for the commercial airline at a connection location of the passenger.

13. A system for transferring responsibility of an unaccompanied minor traveling onboard a commercial airline, the system comprising:

a first computing device disposed at a ticketing location of a departure location for the unaccompanied minor, the first computing device configured to:

receive identification information that identifies the unaccompanied minor; and generate, using the identification information, a machine-readable tag for a body-worn article, the machine-readable tag comprising a first machine-readable optical code comprising encoded information comprising a uniform resource locator (URL) associated with a hosted web service, the machine-readable tag associated with the unaccompanied minor;

acquire, using a first visual sensor of the first computing device, a first photograph of the unaccompanied minor; and communicate the first photograph to the hosted web service;

a first mobile device carried by a first gate agent at the departure location, the first mobile device configured to:

communicatively couple with the body-worn article as worn by the unaccompanied minor;

retrieve, upon decoding the encoded information from the first machine-readable optical code, unaccompanied minor information from the hosted web service using the URL, acquire, using a second visual sensor of the first mobile device, a second photograph of the unaccompanied minor, receive a confirmation of an identity of the unaccompanied minor, wherein the confirmation is based on a comparison of the first photograph and the second photograph, display a first user interface on a visual display of the first mobile device, the first user interface being based on the confirmation and comprising at least a portion of the unaccompanied minor information, authorize, upon receiving a first input while displaying the first user interface, a first transfer of responsibility for the unaccompanied minor to the first gate agent, responsive to authorizing the first transfer of responsibility, attempt to communicate with the hosted web service to update responsibility information to reflect the first gate agent, display, responsive to determining an unavailability of the machine-readable tag or of the hosted web service, a second user interface on the visual display of the first mobile device, the second user interface comprising a second machine-readable optical code that includes (1) at least a portion of the unaccompanied minor information retrieved from the hosted web service and (2) at least the updated responsibility information, authorize, upon receiving a second input from the first gate agent, a second transfer of responsibility for the unaccompanied minor from the first gate agent to a flight attendant, and responsive to authorizing the second transfer of responsibility, communicate with the hosted web service to update responsibility information to reflect the flight attendant; and a second mobile device carried by the flight attendant, the second mobile device configured to:

communicatively couple with one of the body-worn article and the first mobile device;

retrieve, upon decoding the encoded information from one of the first machine-readable optical code and the second machine-readable optical code, the unaccompanied minor information from one of the hosted web service and the second machine-readable optical code, display a third user interface on a visual display of the second mobile device, the third user interface comprising at least a portion of the unaccompanied minor information, and upon receiving a third input from the flight attendant, transmit a request to the hosted web service for the second transfer of responsibility for the unaccompanied minor.

14. A method for monitoring a passenger requiring assistance during travel on a common carrier, the method comprising:

generating a machine-readable tag for a body-worn article, the machine-readable tag comprises encoded passenger information such that the machine-readable tag is associated with the passenger;

decoding the encoded passenger information from a first machine-readable optical code of a machine-readable tag using a first mobile device associated with carried by a first agent of the common carrier, the first agent located at a first gate of a departure location;

using the decoded passenger information, retrieve itinerary information from a hosted web service, the itinerary information having a predefined association with the passenger;

acquiring, using a first visual sensor of the first mobile device, a first photograph of the passenger;

comparing the first photograph with a second photograph of the passenger retrieved from the hosted web service;

displaying, based on the comparison of the first photograph with the second photograph, a first user interface on a visual display of the first mobile device, the first user interface comprising at least a portion of the decoded passenger information and at least a portion of the itinerary information;

receiving, while the first user interface is displayed on the visual display, a first input at the first mobile device that authorizes a first transfer of responsibility for the passenger to the first agent;

responsive to authorizing the first transfer of responsibility, attempting to communicate with the hosted web service to update responsibility information to reflect the first agent, the responsibility information having a predefined association with the passenger;

displaying, responsive to determining an unavailability of the machine-readable tag or of the hosted web service, a second user interface on the visual display of the first mobile device, the second user interface comprising a second machine-readable optical code that includes (1) at least a portion of the itinerary information retrieved from the hosted web service and (2) at least the updated responsibility information, receiving, responsive to a request received from a second mobile device for a second transfer of responsibility to a second agent of the common carrier, a second input from the first agent to authorize the second transfer of responsibility for the passenger from the first agent to the second agent; and responsive to authorizing the second transfer of responsibility, communicate with the hosted web service to update the responsibility information to reflect the second agent.

15. The method of claim 14, wherein a first adult guardian of the passenger provides the first input to the first mobile device.

16. The method of claim 14, wherein the machine-readable tag is included in a body-worn article that also includes transmitter circuitry, the method further comprising:

determining a location of the passenger using signals transmitted by the transmitter circuitry.

17. The method of claim 14, wherein one or both of (1) the encoded passenger information and (2) the hosted web service includes first image information including the passenger and acquired at a first location, and wherein the first image information is compared with second information acquired at a second location to confirm an identity of the passenger.

18. The method of claim 14, wherein the encoded passenger information comprises a uniform resource locator (URL) for the hosted web service.

19. The method of claim 14, further comprising:

decoding the encoded passenger information of the machine-readable tag using a second mobile device associated with a second agent of the common carrier;

retrieving the responsibility information from the hosted web service;

presenting at least the responsibility information on a visual display of the second mobile device; and transmitting, responsive to a third input from the second agent at the second mobile device, the request for the second transfer of responsibility to the hosted web service.

20. The method of claim 19, further comprising:

decoding the encoded passenger information of the machine-readable tag using a third mobile device associated with a third agent of the common carrier, the third agent located at a destination location; and receiving, at the third mobile device, a fourth input from the third agent to request a third transfer of responsibility for the passenger from the second agent to the third agent.

21. The method of claim 20, wherein the first input is provided by a first adult guardian of the passenger, the method further comprising:

receiving, at the third mobile device, a fifth input from a second adult guardian of the passenger to request a fourth transfer of responsibility for the passenger from the third agent to the second adult guardian.

22. The method of claim 21, wherein one or both of (1) the encoded passenger information and (2) the hosted web service includes first image information including the second adult guardian, the method further comprising:

acquiring, using a visual sensor of the third mobile device, second image information including the second adult guardian;

performing image processing using the first image information and the second image information to confirm an identity of the second adult guardian; and authorizing the fourth transfer of responsibility upon confirming the identity of the second adult guardian.

23. The system of claim 1, wherein the first input comprises one of (1) pressing a button of the user interface and (2) providing a digital signature via the first mobile device.

24. The system of claim 1, wherein the second machine-readable optical code further includes all of the encoded passenger information of the first machine-readable optical code.

25. The system of claim 1, wherein displaying the second user interface is responsive to the unavailability of the hosted web service, and wherein the first mobile device is further configured to:

responsive to determining that the hosted web service has become available, communicate the updated responsibility information to the hosted web service.

26. The system of claim 25, wherein the first mobile device retrieves the itinerary information from the hosted web service when at the departure location, and wherein the first mobile device attempts to communicate with the hosted web service when at a second location different than the departure location.

27. The system of claim 25, wherein the second mobile device decodes the second machine-readable optical code and retrieves the updated responsibility information therefrom, and wherein the second mobile device is further configured to:

attempt to communicate the updated responsibility information with the hosted web service.

* * * * *

UNITED STATES PATENT AND TRADEMARK OFFICE

CERTIFICATE OF CORRECTION

PATENT NO. : 10,607,308 B2
APPLICATION NO. : 14/219339
DATED : March 31, 2020
INVENTOR(S) : Michael J. Burgess et al.

It is certified that error appears in the above-identified patent and that said Letters Patent is hereby corrected as shown below:

In the Claims

In Column 18, Line 19, in Claim 14, after “device” delete “associated with”.

Signed and Sealed this
Twenty-sixth Day of May, 2020

Andrei Iancu
*Director of the United States Patent and Trademark Office*